US010579243B2

(12) United States Patent
Bennett et al.

(10) Patent No.: US 10,579,243 B2
(45) Date of Patent: *Mar. 3, 2020

(54) THEMING FOR VIRTUAL COLLABORATION

(71) Applicant: Google LLC, Mountain View, CA (US)

(72) Inventors: David Scrymgeour Bennett, Issaquah, WA (US); Eduardo Fernandez, Bothell, WA (US); Richard James Dunn, Seattle, WA (US); Nikhyl P. Singhal, Menlo Park, CA (US)

(73) Assignee: GOOGLE LLC, Mountain View, CA (US)

( * ) Notice: Subject to any disclaimer, the term of this patent is extended or adjusted under 35 U.S.C. 154(b) by 478 days.

This patent is subject to a terminal disclaimer.

(21) Appl. No.: 15/267,982

(22) Filed: Sep. 16, 2016

(65) Prior Publication Data

US 2017/0003866 A1 Jan. 5, 2017

Related U.S. Application Data

(63) Continuation of application No. 13/554,807, filed on Jul. 20, 2012, now Pat. No. 9,448,708.

(Continued)

(51) Int. Cl.
*G06F 3/00* (2006.01)
*G06F 3/0484* (2013.01)
(Continued)

(52) U.S. Cl.
CPC .......... *G06F 3/04847* (2013.01); *G06F 3/048* (2013.01); *G06F 3/0481* (2013.01);
(Continued)

(58) Field of Classification Search
CPC ...... G06F 3/048; G06F 3/0481; G06F 3/0484; G06F 3/0482; G06F 3/04847
See application file for complete search history.

(56) References Cited

U.S. PATENT DOCUMENTS 7,185,054 B1 2/2007 Ludwig et al.
7,188,143 B2 3/2007 Szeto
(Continued)

OTHER PUBLICATIONS

Facebook Themes, "Facebook Theme Service," retrieved from http://www.facebook-themes.info/, accessed on Jul. 12, 2011, 2 pp.
(Continued)

*Primary Examiner* — Kieu D Vu
*Assistant Examiner* — Andrew Chung
(74) *Attorney, Agent, or Firm* — IP Spring

(57) ABSTRACT

Aspects of the disclosure provide techniques that enable a communication server hosting a virtual communication session to receive theme parameters from a remote server to control the look and feel of the virtual communication session. In one example, a method includes sending a plurality of video feeds for display at a plurality of graphical user interfaces (GUIs) of client devices coupled to a communication session. The communication session enables communication among a plurality of users of the client devices. The method also includes receiving a set of parameters of a theme to modify one or more visual properties of the GUIs. The method also includes sending the set of parameters to the client devices connected to the communication session to modify visual properties of the GUIs displaying the plurality of video feeds at the plurality of client devices based on the parameters of the theme.

20 Claims, 5 Drawing Sheets

Related U.S. Application Data

(60) Provisional application No. 61/549,074, filed on Oct. 19, 2011.

(51) Int. Cl.

| | | |
|---|---|---|
| *G06F 3/048* | (2013.01) | |
| *G06F 3/0481* | (2013.01) | |
| *G06F 3/0482* | (2013.01) | |
| *G06F 3/16* | (2006.01) | |
| *H04N 7/15* | (2006.01) | |
| H04L 12/58 | (2006.01) | |
| H04L 29/08 | (2006.01) | |
| H04L 29/06 | (2006.01) | |

(52) U.S. Cl.
CPC .......... *G06F 3/0482* (2013.01); *G06F 3/0484* (2013.01); *G06F 3/167* (2013.01); *H04N 7/15* (2013.01); H04L 51/32 (2013.01); H04L 67/02 (2013.01); H04L 67/26 (2013.01); H04L 67/42 (2013.01)

(56) References Cited

U.S. PATENT DOCUMENTS

| | | | | |
|---|---|---|---|---|
| 7,412,482 B2* | 8/2008 | Ludwig | ............... | G06Q 10/10 709/204 |
| 7,685,237 B1 | 3/2010 | Weaver et al. | | |
| 7,904,814 B2* | 3/2011 | Errico | ............... | G11B 27/005 715/202 |
| 7,954,065 B2* | 5/2011 | Ubillos | ............... | G11B 27/034 715/786 |
| 8,117,564 B2* | 2/2012 | Woods | ............... | G06T 15/20 715/850 |
| 8,234,688 B2* | 7/2012 | Grandison | ............ | G06Q 50/01 705/319 |
| 8,520,050 B2 | 8/2013 | Blackburn et al. | | |
| 8,698,872 B2* | 4/2014 | Begeja | ............... | H04N 7/147 348/14.01 |
| 8,892,670 B2* | 11/2014 | Chakravarthy | ...... | G06Q 10/101 705/14.66 |
| 9,942,519 B1* | 4/2018 | Pan | ............... | H04N 65/1093 |
| 2004/0148351 A1* | 7/2004 | Cotte | ............ | H04L 29/06027 709/205 |
| 2005/0099492 A1* | 5/2005 | Orr | ............... | H04L 12/1827 348/14.08 |
| 2007/0050733 A1* | 3/2007 | Lee | ............... | G06F 3/0482 715/825 |
| 2008/0115068 A1* | 5/2008 | Smith | ............... | H04L 12/1813 715/758 |
| 2008/0155471 A1* | 6/2008 | Lynn | ............ | H04M 1/274583 715/811 |
| 2008/0225111 A1 | 9/2008 | Honobe | | |
| 2008/0238929 A1 | 10/2008 | Abdo et al. | | |
| 2008/0300908 A1 | 12/2008 | Hunter et al. | | |
| 2009/0037826 A1* | 2/2009 | Bennetts | ............... | H04N 7/147 715/753 |
| 2009/0049395 A1 | 2/2009 | Lee et al. | | |
| 2009/0248824 A1 | 10/2009 | Best et al. | | |
| 2009/0287790 A1* | 11/2009 | Upton | ............... | H04L 12/1827 709/208 |
| 2009/0307058 A1 | 12/2009 | Murphy | | |
| 2009/0327892 A1* | 12/2009 | Douillet | ............ | H04L 12/2812 715/717 |
| 2010/0010864 A1* | 1/2010 | Lee | ............ | G06Q 10/109 705/7.18 |
| 2010/0251177 A1* | 9/2010 | Geppert | ............ | G06F 3/04817 715/821 |
| 2010/0262925 A1* | 10/2010 | Liu | ............ | G06Q 10/10 715/759 |
| 2011/0078591 A1 | 3/2011 | van Os et al. | | |
| 2011/0154192 A1* | 6/2011 | Yang | ............ | G06F 17/2288 715/256 |
| 2011/0249074 A1 | 10/2011 | Cranfill et al. | | |
| 2011/0252340 A1* | 10/2011 | Thomas | ............... | G06Q 10/107 715/756 |
| 2011/0271208 A1* | 11/2011 | Jones | ............... | H04L 12/1822 715/753 |
| 2012/0017149 A1* | 1/2012 | Lai | ............... | H04N 7/15 715/716 |
| 2012/0030594 A1 | 2/2012 | Yokoyama et al. | | |
| 2012/0060101 A1* | 3/2012 | Vonog | ............... | H04N 21/4788 715/751 |
| 2012/0096397 A1* | 4/2012 | Ording | ............... | G06F 3/04883 715/802 |
| 2012/0179981 A1* | 7/2012 | Whalin | ............... | H04W 4/21 715/753 |
| 2012/0278725 A1* | 11/2012 | Gordon | ............... | H04N 21/2665 715/738 |
| 2013/0061140 A1* | 3/2013 | Nseir | ............... | G06F 17/30867 715/273 |
| 2013/0066947 A1* | 3/2013 | Ahmad | ............... | G06F 9/451 709/203 |
| 2013/0097509 A1* | 4/2013 | Gomes | ............... | G06Q 40/02 715/723 |
| 2013/0125013 A1 | 5/2013 | Lettau et al. | | |
| 2013/0132857 A1* | 5/2013 | Shapiro | ............... | H04L 63/1483 715/744 |
| 2014/0173467 A1* | 6/2014 | Clavel | ............... | H04L 12/1822 715/758 |

OTHER PUBLICATIONS

FT Facebook Themes, "Add Themes to Your Facebook Profile," retrieved from http://facebookthemes.org/, accessed on Jul. 12, 2011, 2 pp.

* cited by examiner

THEMING FOR VIRTUAL COLLABORATION

CROSS-REFERENCE TO RELATED APPLICATIONS

This application is a continuation of U.S. application Ser. No. 13/554,807, filed Jul. 20, 2012, which claims the benefit of U.S. Provisional Application No. 61/549,074, filed Oct. 19, 2011. The disclosure of each of the above applications is incorporated herein in their entirety.

TECHNICAL FIELD

The disclosure relates to virtual socializing over a network and, more specifically, to configuring client interfaces used for virtual socializing.

BACKGROUND

Multiple users of computing devices may often engage in real-time video communications, such as video conferencing, where the users (also referred to as participants) exchange live video and audio transmissions. In some examples, visual representations of the users may be shared with each user engaged in real-time video communications. Each computing device associated with a user may include a client that enables the real-time video communication. In some instances, the client may include a graphical interface that displays the visual representations of each of the users.

SUMMARY

In one example, a method includes sending, by one or more computing devices, a plurality of video feeds for display at a plurality of graphical user interfaces (GUIs) of client devices coupled to a communication session. The communication session enables communication among a plurality of users of the one or more computing devices, and each of the plurality of video feeds includes at least a visual representation of user participation in the communication session. The method also includes, receiving, by the one or more computing device, a set of parameters of a theme to modify one or more visual properties of the GUIs. The method also includes sending, by the one or more computing device, the set of parameters to the client devices coupled to the communication session to modify visual properties of the GUIs displaying the plurality of video feeds at the plurality of client devices based on the parameters of the theme.

In one example, a computer-readable storage medium includes instructions that, when executed, cause one or more processors to perform operations including, sending a plurality of video feeds for display at a plurality of graphical user interfaces (GUIs) of client devices coupled to a communication session. The communication session enables communication among a plurality of users of the client devices, and each of the plurality of video feeds includes at least a visual representation of user participation in the communication session. The computer-readable storage medium further includes instructions that, when executed, cause one or more processors to perform operations including, receiving a set of parameters of a theme to modify one or more visual properties of the GUIs. The computer-readable storage medium further includes instructions that, when executed, cause one or more processors to perform operations including sending the set of parameters to the client devices connected to the communication session to modify visual properties of the GUIs displaying the plurality of video feeds at the plurality of client devices based on the parameters of the theme.

In one example, a computing device includes one or more processors. The computing device further includes a server module configured to send a plurality of video feeds for display at a plurality of graphical user interfaces (GUIs) of client devices coupled to a communication session. The communication session enables communication among a plurality of users of the client devices, and each of the plurality of video feeds includes at least a visual representation of user participation in the communication session. The computing device also includes a theme module configured to receive a set of parameters of a theme to modify one or more visual properties of the GUIs. The server module is also configured to send the set of parameters to the client devices connected to the communication session to modify visual properties of the GUIs displaying the plurality of video feeds at the plurality of client devices based on the parameters of the theme.

The details of one or more examples are set forth in the accompanying drawings and the description below. Other features, objects, and advantages will be apparent from the description and drawings, and from the claims.

DETAILED DESCRIPTION

Overview

Figure 1:
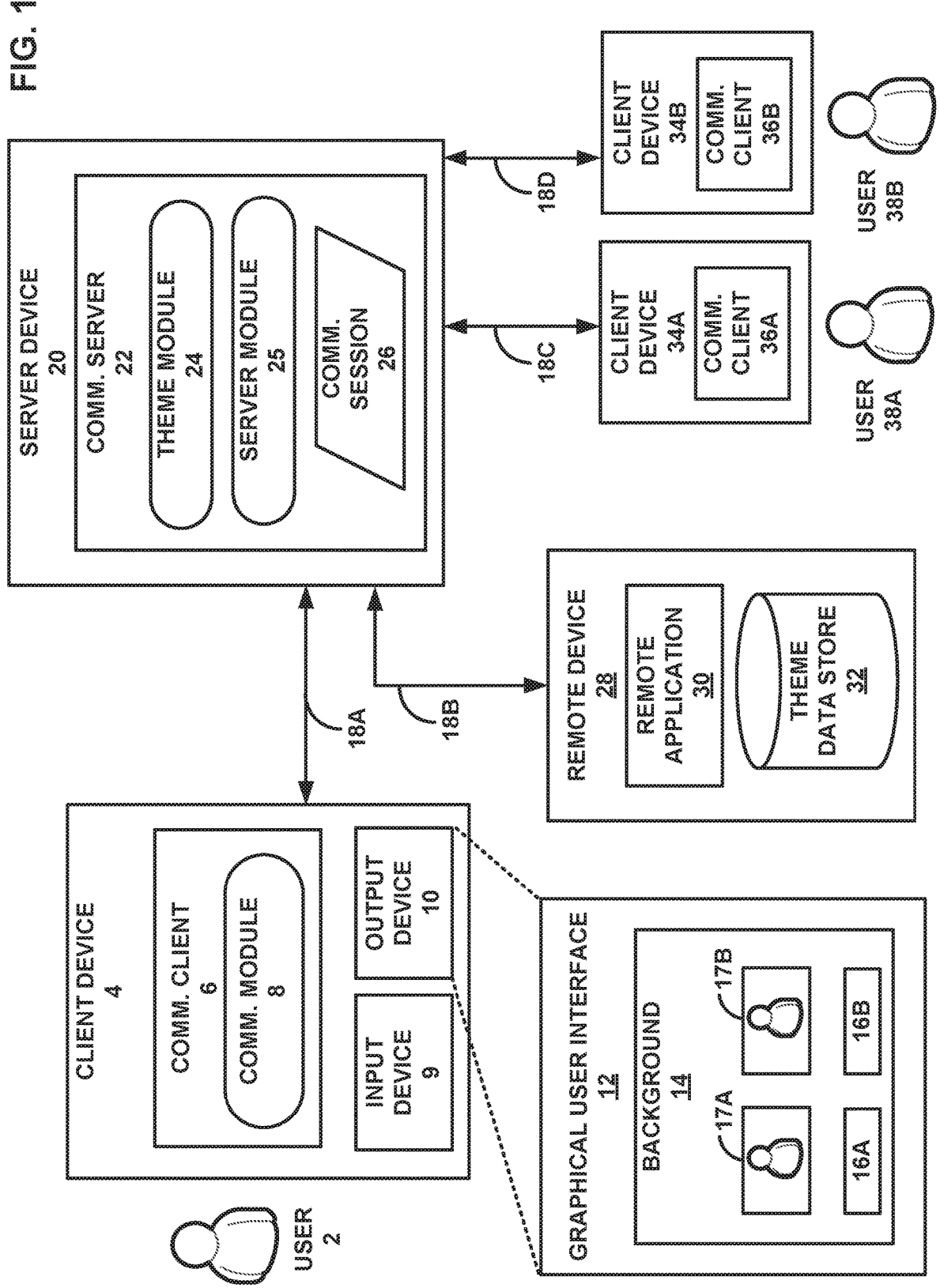
FIG. 1 is a block diagram illustrating an example of one or more client devices connected to a communication session that enables communication among users, in accordance with one or more aspects of the present disclosure.

Friends, family members, or other individuals who wish to socialize or otherwise communicate may not always be in the same physical location at the time they would like to communicate. Some individuals may rely upon telephonic, text, or other forms of communication that support limited forms of socializing. For example, conventional forms of communication may support multi-way audio and/or video communication. However, some forms of communication are not sufficient to be able to give the individuals an experience similar to actually socializing in person. Talking with someone over the phone or texting someone does not create a shared experience similar to sitting a room together watching a movie or playing a game.

Rather than interacting together in the same physical location, techniques of this disclosure may, in various instances, provide a mechanism for two or more individuals to socialize in the same virtual location (e.g., a virtual communication session). A virtual communication session is a virtual space where multiple users can engage in a conversation and/or share information. For example, the individuals participating in the virtual hangout may share and watch videos, play games, participate in video, audio, or text chat, surf the web, or any combination thereof. In other words, techniques of this disclosure may enable the creation of a virtual hangout that may mirror the experience of individuals hanging out in the same physical location.

Users may connect to the virtual communication session using a communication client that displays one or more video feeds of other users participating in the virtual communication session. Each communication client connected to the communication session may include the same or substantially similar GUI thereby providing a common look and feel for the virtual communication session. The communication client may cause an output device to display graphical elements (e.g., video feeds) in a graphical user interface (GUI) that include one or more visual properties. Visual properties of a GUI may include the size, position, and appearance of graphical elements included in the GUI.

Aspects of the disclosure provide techniques that enable a user to select themes that modify visual properties of a GUI. For instance, a theme may include one or more parameters that may modify visual properties of a GUI. By allowing users to apply themes that modify visual properties of the GUI, users may create and select different configurations for different virtual communications sessions. Allowing users to create and select different configurations for different virtual communications sessions may improve the customizability of the visual communication session and the user experience.

Aspects of the disclosure further provide techniques that enable a communication server hosting a virtual communication session to receive theme parameters from a remote server to control the look and feel of the virtual communication session. For instance, a remote server may include an application that sends parameters of a theme to an interface provided by the communication server. The parameters may in turn be sent by the communication server to each of the communication clients connected to the session thereby causing visual properties of the GUIs displayed at each of the client devices to be modified concurrently. In this way, a common look and feel of the virtual configuration session may be configured by a remote server that specifies one or more themes.

As used throughout this disclosure, headings are included to improve the clarity of the disclosure and are not used to define separate examples. In some examples, features of various examples may be combined and/or used from among multiple headings in accordance with aspects of the present disclosure.

Example System

FIG. 1 is a block diagram illustrating an example of one or more client devices connected to a communication session that enables communication among users, in accordance with one or more aspects of the present disclosure. FIG. 1 includes client devices 4 and 34, server device 20, and remote device 28. Client device 4 includes input device 9, output device 10, and communication client 6, which further includes communication module 8. Communication client 6 may further cause output device 10 to display graphical user interface (GUI) 12. GUI 12 may further include background 14, video feed 17, and control buttons 16A, 16B. Client devices 34A, 34B are computing devices similar to client device 4 and further include respective communication clients 36A, 36B similar to communication client 6.

As shown in FIG. 1, server device 20 includes communication server 22, theme module 24, server module 25, and communication session 26. Remote device 28 includes remote application 30 and theme data store 32. Each of client devices 4 and 34, server device 20, and remote device 28 may be connected by communication channels 18, which in some examples may be wired or wireless communication channels capable of sending and receiving data. One example of communication channel 18 may include a Transmission Control Protocol and/or Internet Protocol (TCP/IP) network connection.

Client devices 4 and 34 may be communicatively coupled to a communication session 26 that enables communication among users of client devices 4 and 34, in accordance with one or more aspects of the present disclosure. Examples of client devices 4 and 34, may include, but are not limited to, portable or mobile devices such as mobile phones (including smart phones), laptop computers, personal digital assistants (PDAs), portable gaming devices, portable media players, televisions or similar such devices with one or more processors attached thereto, or embedded therein and e-book readers. Client device 4 and each of client devices 34 may be the same or different types of devices. For example, client device 4 and client device 34A may both be mobile phones. In another example, client device 4 may be a mobile phone and client device 34A may be a desktop computer.

Client devices 4 and 34 may include one or more input devices 9. Input device 9 may include keyboards, pointing devices, microphones, and cameras capable of recording one or more images or video. Client devices 4 and 34 may also include output devices 10. Examples of output device 10 may include a video graphics card, computer display, sound card, and speakers.

Client devices 4 and 34 of FIG. 1 may include communication clients 6 and 36. Communication clients 6 and 36 may provide similar or the same functionality. In some examples, communication clients 6 and 36 may include mobile or desktop computer applications that provide functionality described herein. Communication clients 6 and 36 may include communication modules such as communication module 8 as shown in communication client 6. Communication clients 6 and 36 may exchange audio, video, text, or other information with other communication clients connected to communication session 26. Communication module 8 may cause output device 10 to display GUI 12. Communication module 8 may further include functionality that enables communication client 6 to connect to communication server 22 and join one or more communication sessions (e.g., communication session 26). Two or more client devices (e.g., client device 4 and client device 34) may join the same communication session 26 to enable communication among the client devices.

GUI 12 may include graphical elements such as background 14, video feeds 17, and control buttons 16. Graphical elements may include any visually perceivable object that may be displayed in GUI 12. Examples of graphical elements may include a background image, video feed, text, control buttons, input fields, or scroll bars. In one example, input device 9 may generate a visual representation of user 2. A visual representation may be a still image or group of images (e.g., a video). Communication client 6 may send the visual representation to communication server 22, which may determine that communication clients 6 and 36 are connected to communication session 26. Consequently, communication server 22 may send the visual representation of user 2 to communication clients 36A and 36B as video feeds. Communication clients 36A and 36B may, upon receiving the visual representation, cause an output device of client devices 34A and 34B to display the video feeds. Similarly, client device 4 may receive visual representations of users 38A and 38B, which are in turn included as video feeds 17A and 17B in GUI 12 of client device 4.

In addition to exchanging video information, the communication clients may exchange audio, text and other information via communication session 26. For instance, microphones may capture sound at or near each of client devices 4 and 34, for example, voices of users 2 and 38. Audio data generated by client devices 4 and 34 from the sound, may be exchanged between communication clients connected to communication session 26 of communication server 22. For instance, if user 4 speaks, input device 9 may receive the sound and convert it to audio data. Communication client may then send the audio data to communication server 22. Communication server 22 may determine communication client 6 is connected to communication session 26 and further determine other communication clients connected to communication session 26. Upon determining that communication clients 36A and 36B are connected to communication session 26, communication server 22 sends the audio data to each of communication clients 36. In still other examples, text such a real-time instant messages or files may be exchanged between communication clients 6 and 36 using similar techniques.

As shown in FIG. 1, server device 20 includes communication server 22, theme module 24, server module 25 and communication session 26. Examples of server device 20 may include a personal computer, a laptop computer, a handheld computer, a workstation, a data storage system, a supercomputer, or a mainframe computer. Communication server 22 may generate, manage, and terminate communication sessions such as communication session 26. In some examples, communication server 22 is an application executing on server device 20 that performs operations described herein. Server device 20 may execute with multiple processors, may have functionality distributed across multiple machines, etc. Server device 20 may also execute as a virtual machine executing on underlying hardware (which itself may be a single or multiple machines). Server device 20 may also execute as a process, or a set of processes, on a cloud server or service.

In one example, server module 25 of communication server 22 may receive a request to generate communication session 26. For instance, communication client 6 may send a request to communication server 22 that causes server module 25 to generate communication session 26. Upon generating communication session 26, other communication clients such as communication clients 36 may also connect to communication session 26. For instance, user 2 may cause communication client 6 to send invitations to client devices 34A and 34B of users 38A and 38B. Upon receiving the invitations, users 38A and 38B may cause communication clients 36A and 36B to send requests to communication server 22 to join communication session 26. Server module 25, upon receiving the requests, may connect communication clients 36 to communication session 26. In other examples, users 38A and 38B may discover communication session 26 by browsing a feed that includes an indicator identifying communication session 26. Users 38 may similarly join communication session 26 by sending requests to communication server 22.

Communication session 26 may enable communication clients connected to communication session 26 to exchange information. As such, communication session as used herein is a broad term encompassing as its plain and ordinary meaning, including but not limited to, one or more objects, which may be stored in and/or are executable by software or hardware, that may enable communication clients coupled to the one or more objects to exchange information. Communication session 26 may include data that, among other things, specifies communication clients connected to communication session 26. Communication session 26 may further include session information such as a duration of the communication session, security settings of the communication session, and any other information that specifies a configuration of the communication session. Server module 25 may send and receive information from communication clients connected to communication session 26 thereby enabling users participating in the communication session to exchange information. Communication server 22 may also include a theme module 24 implementing techniques of the present disclosure.

In some examples, communication client 6 may cause output device 10 to display GUI 12. As previously described, GUI 12 may include graphical elements such as background 14, video feeds 17, and control buttons 16. Visual properties of GUI 12 may include the size, position, and appearance of graphical elements included in GUI 12. For instance, a visual property of video feed 17A may include a size of video feed 17A, e.g., 540×480 pixels. A different visual property of video feed 17A may include a position of video feed 17A within GUI 12 specified by a coordinate pair comprising an x-axis value and a y-axis value. Other visual properties may include chrominance and luminance effects applied to a graphical element. Still other visual properties may include text or other objects that are superimposed on a graphical element (e.g., text or objects that are superimposed on video feed 17A). Generally, a visual property as used herein is a broad term encompassing as its plain and ordinary meaning, including but not limited to any characteristic of a graphical element that, when modified, results in a visually perceptible change in a graphical element.

Visual properties may be modified by one or more parameters. In some examples, a parameter may identify a graphical element of a GUI and include data that specifies a modifier of one or more visual properties. In some examples, the parameter may identify a type of graphical element, such as a control button type. The type of graphical element may be associated with a modifier, such as a specified color to be applied to the graphical element. In this way, a parameter may modify one or more visual properties of multiple graphical elements of the same type. In other examples, a parameter may identify a graphical element of a GUI by a unique identifier of the graphical element. For instance, each control button in a GUI may include a unique identifier. A parameter may specify an identifier that unique identifies the graphical element and a modifier of one or more visual properties of the visual element. In this way, parameters, generally, may be applied to groups of graphical elements or individually to specific graphical elements. When a communication client receives a parameter, the communication client may apply the modifier of the parameter to one or more graphical elements in the GUI generated by the communication client. In this manner, parameters may modify visual properties of graphical elements included in the GUI.

In some examples, a theme may include a set of one or more parameters. Themes may therefore specify a configuration of one or more parameters that modify one or more visual properties of graphical elements included in a GUI. Themes may further include one or more triggers that specify when a parameter is to be applied to a graphical element. For instance, a trigger may specify that a parameter is to be applied to a graphical element at a particular time, day, or season. In other examples, a trigger may specify that a parameter is to be applied to a graphical element upon the occurrence of an event (e.g., a user joining a communication session). A trigger, generally, may specify a condition that, when satisfied, indicates a parameter to be applied to a graphical element. In one example a condition may be satisfied when an event matches a condition specified by a trigger.

Themes may further include and or specify locations of graphical content that may be applied to one or more graphical elements. Graphical content may include text, images, or any other visually perceptible effect or object. In some examples, the graphical content may be stored on a remote device, and the theme may specify the location of the graphical content. For instance, a location may be specified by a Uniform Resource Locator (URL). Thus in one example, the location of a background image stored on a remote device may be specified by a parameter. When the parameter is applied to the GUI generated by the communication client, the background image may be retrieved from the remote device.

In some examples, themes may specify one or more groups and parameters may be associated with each group. A group may, for example, be a group of users. If a user is associated with a group, the parameters that are associated with the group may be applied to the GUIs of users included in the group that are participating in a communication session. Themes may, in some examples, be specified as structured information in a document such as an Extensible Markup Language (XML) document. In other examples, themes may be stored in a datastore such as a database or other data structure.

As shown in FIG. 1, communication server 22 may include theme module 24. In some examples, theme module 24 may receive and send theme parameters to communication clients connected to a communication session thereby causing visual properties of the GUIs displayed at each of the client devices to be modified concurrently. In this way, a common look and feel of the virtual communication session may be included in the GUI of each communication client connected to the communication session. For instance, as shown in FIG. 1, communication clients 6 and 36 may be connected to communication session 26. User 2 may provide a user input via input device 9 that causes communication module 8 to select a theme stored on client device 4. Upon selecting the theme, communication module 8 may apply the parameters of the theme to communication client 6 thereby modifying visual properties of the graphical elements included GUI 12.

Communication module 8 may further send parameters of the theme to communication server 22. Theme module 24 may receive the parameters and further send a message to server module 25 to determine that communication clients 36A and 36B are connected to communication session 26. Consequently, theme module 24 may send the parameters of the theme to each of client devices 34A and 34B. Upon receiving the parameters, communication clients 36A and 36B may apply the parameters to graphical elements in GUIs generated by communication clients 36A and 36B. In this way, a common look and feel of the virtual communication session may be included in the GUI of each communication client connected to the communication session.

In some aspects of the present disclosure, themes may be stored on and/or applied by a remote device 28. Examples of remote device 28 may include a personal computer, a laptop computer, a handheld computer, a workstation, a data storage system, a supercomputer, or a mainframe computer. Remote device 28 may further include a remote application 30 and theme data store 32. Theme data store 32 may be a database, file or any other data structure capable of storing a theme and/or parameters of a theme as described herein.

In some examples, user 2 may use communication client 6 to send a message to communication server 22 to select a theme stored on remote device 28. For instance, communication client 6 may send a message to communication server 22 requesting a set of themes that may be selected by communication client 6. Theme module 24, upon receiving the request, may send a message to remote device 28 requesting a set of themes included in theme data store 32. Remote application 30, executing on remote device 28, may generate a set of theme identifiers that identify the themes stored in theme data store 32. Remote application 30 may then send the set of theme identifiers to server device 20. Theme module 24 may send a message to communication client 6 that includes the set of theme identifiers. Communication client 6, upon receiving the identifiers may cause output device 10 to display a menu that includes the identifiers. User 2 may provide a user input via input device 9 to communication client 6 to select one or more of the theme identifiers included in the message. Responsive to receiving the user input, communication client 6 may send a message that indicates the selected one or more theme identifiers to communication server 22.

Theme module 24 may send a message to remote device 28 that requests parameters of the one or more themes selected by 2. Remote application, upon receiving the message may select the parameters from theme data store 32. Remote application 32 may then send the parameters to communication server 22. Theme module 24, upon receiving the parameters, may send a message to server module 25, which queries session data of communication session 26, to determine that communication clients 6, 36A, and 36B are connected to communication session 26. Consequently, theme module 24 sends the parameters to communication clients 6, 36A and 36B. Each of communication clients 6, 36A, and 36B, upon receiving the parameters, may apply the parameters to graphical elements included in GUIs generated by each of the communications clients. In this way, a remote device 28 that specifies one or more themes may configure a common look and feel of the configuration session 26.

In some examples, remote application 30 may manage the application of themes to communication clients that are connected to a communication session. For instance, remote device 28 may "push" parameters of a theme to an interface, such as an Application Programming Interface (API), of communication server 22, which in turn may send the parameters to teach of the communication clients. In one example, user 2 may select a theme stored on remote device 28 as previously described. Consequently, remote device 28 may send a message from communication server 22 that indicates the one or more themes selected by user 2. In addition, theme module 24 may include a communication session identifier that uniquely identifies communication session 26 in the message. Upon receiving the message, remote application 30 may select the themes identified by the message and send parameters to communication server 22. In various instances, the selected themes may include one or more triggers as further described in the disclosure. In these instances, if the triggers included in the theme are later satisfied, remote application 30 may send a message that includes the parameters associated with the trigger to communication server 22. Remote application 30 may include the session identifier in the message such that theme module 24 may send the parameters to each communication client associated with communication session 26. In this way, remote application 30 may manage and apply one or more selected themes to a communication session via an API provided by communication sever 22.

In some examples, when remote application 30 manages the application of themes to communication clients, communication server 22 may send events to remote application 30. For instance, a theme managed by remote application 30 may include a trigger based on a user joining a communication session. In such an example, theme module 24 may initially receive a message from server module 25 when the new user joins communication session 26. Theme module 24 may send the event that indicates the new user has joined the session to remote application 30. Remote application 30, upon receiving the event, may determine whether the event indicates that a trigger of the theme has occurred. If the event indicates a trigger has occurred, remote application 30 may send one or more parameters associated with the theme to theme module 24. Theme module 24 may, in turn, send the parameters to each of the communication clients connected to communication session 26. In this way, events that occur during communication session 26, which are associated with triggers in a theme may be sent to remote device 28.

Although previous examples herein have described themes stored on client device 4 and remote device 28, themes may also be stored on server 20 and applied similarly using theme module 24. For instance, remote application 30 may send a theme to communication server 22. Theme module 24, upon receiving the theme, may send parameters of the theme to one or more communication clients connected to communication session 26. Moreover, theme module 24 may determine events associated triggers have occurred, e.g., a user joining communication session 26. Theme module 24 may send parameters of themes associated with such events to communication clients as described similarly with respect to remote application 30. In this way, a common look and feel of the configuration session 26 may be configured by communication server 22 that stores one or more themes.

Example Device

Figure 2:
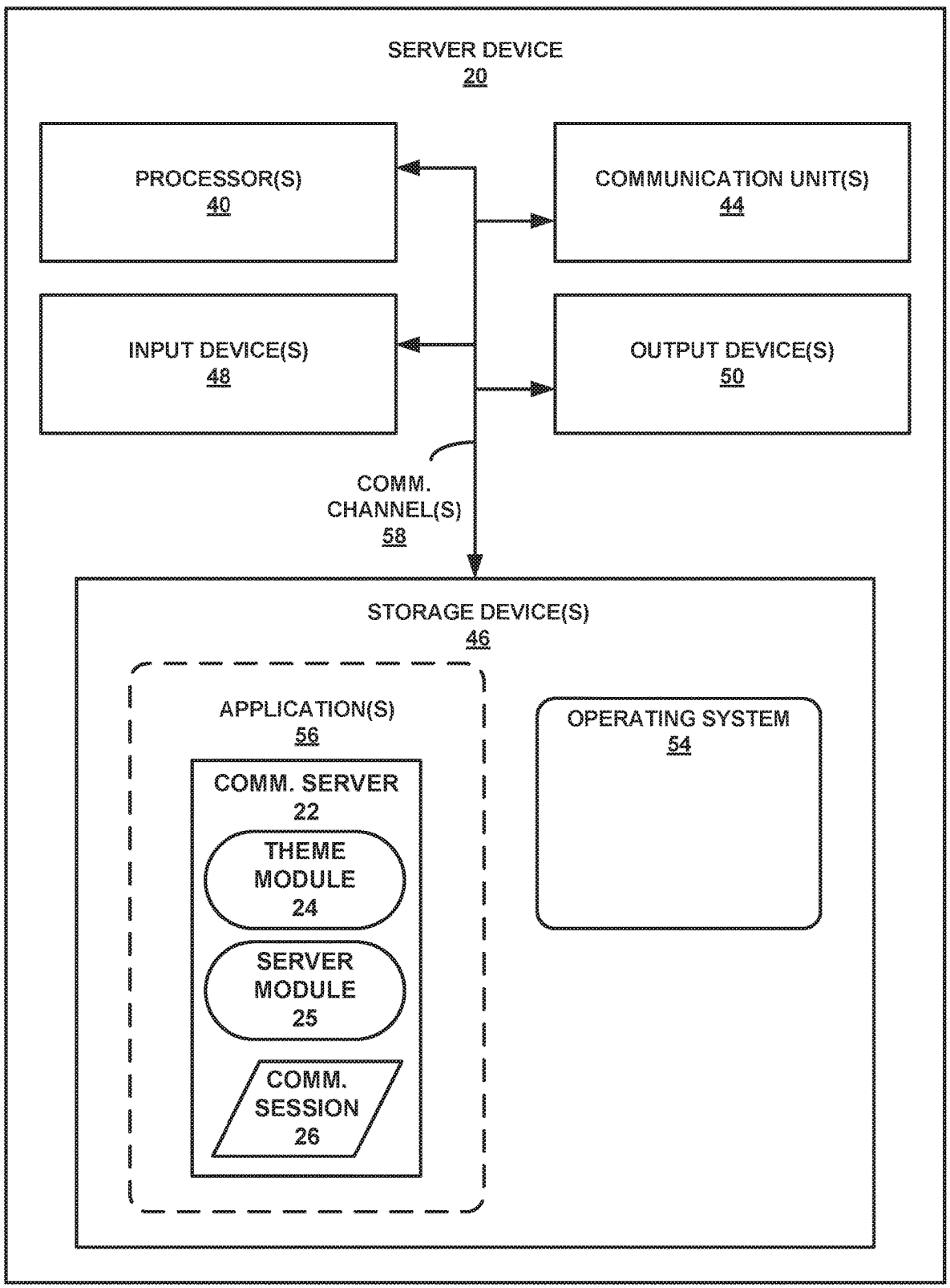
FIG. 2 is a block diagram illustrating further details of one example of a server device shown in FIG. 1, in accordance with one or more aspects of the present disclosure.

FIG. 2 is a block diagram illustrating further details of one example of a server device shown in FIG. 1, in accordance with one or more aspects of the present disclosure. FIG. 2 illustrates only one particular example of server device 20, and many other example examples of server device 20 may be used in other instances.

As shown in the specific example of FIG. 2, server device 20 includes one or more processors 40, a communication unit 44, one or more storage devices 46, input device 48, and output device 50. Server device 20 also includes an operating system 54 that is executable by server device 20. Server device 20, in one example, further includes communication server 22 that is also executable by server device 20. Each of components 40, 44, 46, 48, 50, 54, and 56 may be interconnected (physically, communicatively, and/or operatively) for inter-component communications. In some examples, communication channels 58 may include a system bus, network connection, interprocess communication data structure, or any other channel for communicating data. As one example in FIG. 3, components 40, 44, 46, 48, and 50 may be coupled by one or more communication channels 58. Applications 56 (including communication server 22, theme module 24, server module 25, communication session 26) and operating system 94 may also communicate information with one another as well as with other components in server device 20.

Processors 40, in one example, are configured to implement functionality and/or process instructions for execution within server device 20. For example, processors 40 may be capable of processing instructions stored in memory 42 or instructions stored on storage devices 46. Examples of processors 40 may include, any one or more of a microprocessor, a controller, a digital signal processor (DSP), an application specific integrated circuit (ASIC), a field-programmable gate array (FPGA), or equivalent discrete or integrated logic circuitry.

Storage device 46, in one example, is configured to store information within server device 20 during operation. Storage device 46, in some examples, is described as a computer-readable storage medium. In some examples, storage device 46 is a temporary memory, meaning that a primary purpose of storage device 46 is not long-term storage. Storage device 46, in some examples, is described as a volatile memory, meaning that storage device 46 does not maintain stored contents when the computer is turned off. Examples of volatile memories include random access memories (RAM), dynamic random access memories (DRAM), static random access memories (SRAM), and other forms of volatile memories known in the art. In some examples, storage device 46 is used to store program instructions for execution by processors 40. Storage device 46, in one example, is used by software or applications running on server device 20 (e.g., applications 56) to temporarily store information during program execution.

Storage devices 46, in some examples, also include one or more computer-readable storage media. Storage devices 46 may be configured to store larger amounts of information than memory 42. Storage devices 46 may further be configured for long-term storage of information. In some examples, storage devices 46 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Server device 20, in some examples, also includes a communication unit 44. Server device 20, in one example, utilizes communication unit 44 to communicate with external devices via one or more networks, such as one or more wireless networks. Communication unit 44 may be a communication unit card, such as an Ethernet card, an optical transceiver, a radio frequency transceiver, or any other type of device that can send and receive information. Other examples of such communication units may include Bluetooth®, 3G and WiFi® radios in mobile computing devices as well as USB. In some examples, server device 20 utilizes communication unit 44 to wirelessly communicate with an external device such as remote device 28 and client devices 4 and 34 of FIG. 1, a mobile phone, or other networked computing device.

Server device 20, in one example, also includes one or more input devices 48. Input device 48, in some examples, is configured to receive input from a user through tactile, audio, or video feedback. Examples of input device 48 include a presence-sensitive screen, a mouse, a keyboard, a voice responsive system, video camera, microphone or any other type of device for detecting a command from a user. In some examples, a presence-sensitive screen includes a touch-sensitive screen.

One or more output devices 50 may also be included in server device 20. Output device 50, in some examples, is configured to provide output to a user using tactile, audio, or video stimuli. Output device 50, in one example, includes a presence-sensitive screen, a sound card, a video graphics adapter card, or any other type of device for converting a signal into an appropriate form understandable to humans or machines. Additional examples of output device 50 include a speaker, a cathode ray tube (CRT) monitor, a liquid crystal display (LCD), or any other type of device that can generate intelligible output to a user.

Server device 20 may include operating system 54. Operating system 54, in some examples, controls the operation of components of server device 20. For example, operating system 54, in one example, facilitates the interaction of communication server 22 with processors 40, communication unit 44, storage devices 46, input device 48, and output device 50. As shown in FIG. 2, communication server 22 may include theme module 24, server module 25, and communication session 26, as described in FIG. 1. Communication server 22, theme module 24, and server module 25 may each include program instructions and/or data that are executable by server device 20. For example, theme module 24 and server module 25 may include instructions that cause communication server 22 executing on server device 20 to perform one or more of the operations and actions described in the present disclosure.

In one example, communication unit 44 may receive multiple video feeds from communication clients connected to communications session 26. As such, a video feed as used herein is a broad term encompassing as its plain and ordinary meaning, including but not limited to one or more visual representations associated with a communication client coupled to a communication session. For instance, a video feed may include one or more visual representations of user participation associated with a communication client that is coupled to a communication session. Upon receiving the video feeds, server module 25 may determine which communication clients are connected to communication session 26. Server module 25 may cause network device 44 to send the video feeds to each of the communication clients connected to communication session 26 for display at the GUIs of each of the communication devices that include the communication clients. In this way, users participating in communication session 26 may view visual representations of other users participating in the communication session.

In the current example, communication unit 44 may receive a message from a communication client that requests a set of themes that may be selected by the communication client. Theme module 24 may further generate a message that includes a request for themes. Theme module 24 causes communication unit 44 to send the message to a remote device, which may return a set of identifiers that identify selectable themes stored on the remote device. Theme module 24 then causes communication unit 44 to send a message that includes the set of identifiers to the communication client. The user of the communication client may provide a user input to select one or more identifiers, which are in turn sent to server device 10. Communication unit 44 may receive the selected identifiers, which theme module 24 may then in turn cause communication unit 44 to send to the remote device. The remote device may then select parameters of the themes identified by the selected identifiers. The remote device may send the parameters to server device 10.

Theme module 24 may receive the parameters via communication unit 44. Upon receiving the parameters, theme module 24 may send a message to server module 25 to determine which communication clients are connected to communication session 26. Theme module 24 may receive a set of identifiers of communication clients from server module 25. Theme module 24 may then cause communication unit 44 to send the parameters to each of the communication clients connected to communication session 26. The parameters, when received and applied by each of the communication clients, may modify visual properties of GUIs displayed at each of the computing devices executing the communication clients.

Example Interface

Figure 3:
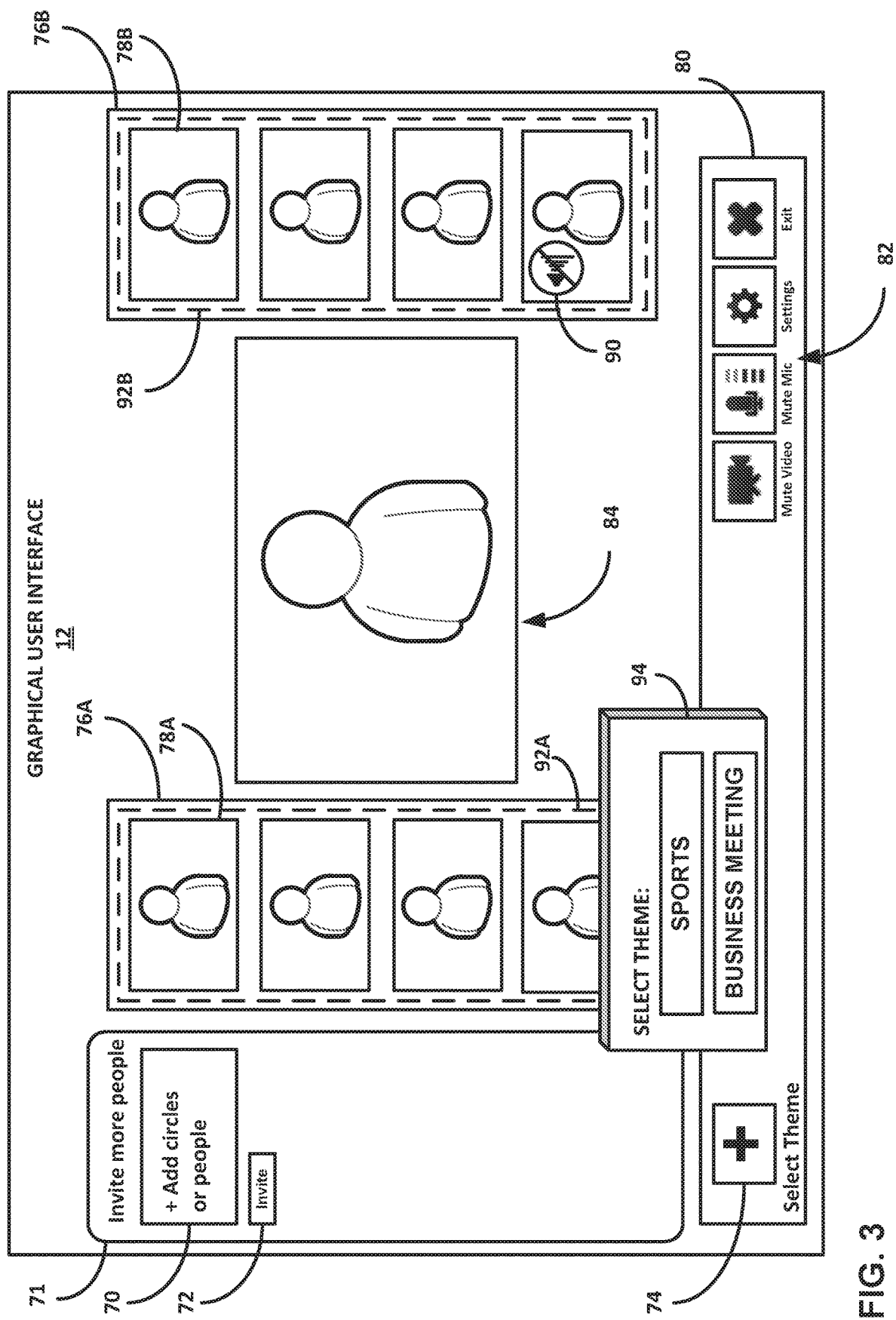
FIG. 3 is a block diagram illustrating one example of a graphical display of a communication client, in accordance with one or more aspects of the present disclosure.

FIG. 3 is a block diagram illustrating one example of a graphical display of a communication client, in accordance with one or more aspects of the present disclosure. FIG. 3 includes GUI 12, which may be an example of GUI 12 as shown in FIG. 1. GUI 12 further includes invitation panel 71, control panel 80, rows 76A and 76B, and video feed 84. Invitation panel may further include user selection button 70 and invitation button 72. Control panel 80 may further include theme selection button 74 and session control buttons 82. Row 76A may include video feed 78A and row 76B may include video feed 78B.

As shown in FIG. 3, GUI 12 may include invitation panel 71. Invitation panel 71 may enable user 2 of FIG. 1 to invite other users to join communication session 26. Invitation panel 71 may include a user selection button 70 that enables user 2 to initially select other users. For instance, when users 2 selects user selection button 70, communication module 8 may cause GUI 12 to display identifiers of one or more users or groups of users that user 2 may select for invitation to communication session 26. After user 2 has selected one or more users, user 2 may further select invitation button 72. In some examples, when invitation button 72 is selected by user 2, communication module 8 may send invitations to the selected users.

GUI 12 may further include control panel 80. Control panel 80 may include one or more session control buttons that enable user 2 to control functions of communication client 6 and client device 4. For instance, control panel 80 may include session control buttons 82. Session control buttons 82 may be associated with various functions that may be performed by communications module 8. Various functions may include muting a camera attached to client device 4, muting a microphone of computing device 4, accessing user specified settings of communication client 6, and/or exiting communication session 26.

Control panel 80 may include theme selection button 74 that, when selected, enables user 2 to select a theme that may be applied to GUI 12. For instance, upon selecting theme selection button 74, communication module 8 may cause GUI 12 to display menu 94 that includes a set of themes that user 2 may select. In some examples, one or more of the themes may be stored on client device 4, while in other examples, one or more of the themes may be stored on server device 20 or remote device 28. User 2 may provide a user input to select one or more of the themes, which communication module 8 may apply to graphical elements of GUI 12. Moreover, communication module 8 may send a message to communication server 22 that user 2 has selected a theme. In some examples, the message may further include parameters of the theme. Communication server 22 may, responsive to receiving the message, send parameters of the selected theme to other communication clients connected to communication session 26.

As shown in FIG. 3, a theme may specify one or more parameters that cause communication module 8 to modify visual properties of GUI 12 displayed at client device 4. In some examples, parameters may cause communication module 8 to display video feeds in a substantially parallel orientation at GUI 12 such as in a row (e.g., horizontal) or a column (e.g., vertical). For instance, user 2 may select a theme that specifies a data that indicates to communication module 8 to display a first video feed group 92A in a first row 76A and a second video feed group 92B in a second row 76B. In one non-limiting example, parameters may include the following structured data that may be processed and applied by communication module 8 to graphical elements of GUI 12. The parameters may be included in a theme that is stored on client device 4, server device 20, and/or remote device 28.

```
1     <group:group1>
2         <row>
3             <element_type:video-feed>
4             <orientation:vertical>
5             <position:left>
6             <size:thumbnail>
7         </row>
8     </group>
9     <group:group2>
10        <row>
11            <element_type:video-feed>
12            <orientation:vertical>
13            <position:right>
14            <size:thumbnail>
15        </row>
16    </group>
17    <trigger:active_speaker>
18        <element_type:video-feed>
19        <position:center>
20        <size:large>
21    </trigger>
```

Lines 1 and 9 of the parameter specify to communication module 8 two different groups identified by group names: group1, group2. Lines 2 and 10 further indicate that communication module 8 will include graphical elements of group1 and group2 in rows. For instance, as shown in FIG. 3, first group of video feeds 78A are included in row 76A and second group of video feeds 92B are included in row 76B. Lines 3 and 11 specify the type of graphical element, e.g., video-feed, to which communication module 8 will apply the parameters. For instance, video feed 76A may be a graphical element of type video-feed. Lines 4 and 12 indicate the orientation of each of rows 76A and 76B is vertical as shown in FIG. 3. Lines 5 and 13 indicate positions of rows 76A and 76B within GUI 12. For instance positions may include enumerated types such as top, bottom, left, right, and center with predefined pixel values. In other examples positions may include absolute x,y coordinates relative to an origin of GUI 12.

Lines 6 and 14 indicate that the size of each video feed, e.g., thumbnail. A size of each graphical element may be specified in pixel dimensions or alternatively according an enumerated type such as thumbnail, small, medium, large, which may each be associated with predefined pixel dimensions. As shown in FIG. 3, a size of video feed 84 may be larger than a size of video feeds included in video feed group 92A.

In one example, communication module 8 may receive video feeds from server device 20. Each video feed may include a visual representation of user participation in communication session 26. For instance, user participation may include actions and/or physical appearances of the user that may be recorded or captured by an input device. User participation may also include one or more other physical objects and/or actions of the physical objects that may be recorded or captured by an input device. For instance, user participation may be the user in the video, the user pointing the video at another object or event (e.g., the user's dog, the view out the windows, etc.), a rendered scene by the user (e.g., a shared browser window or computer desktop), etc. Users participating in communication session 26 may each further be associated with a first group or a second group (e.g., video feed group 92A or 92B). For instance, the first group may be identified by a first group identifier attribute and the second group may be identified by a second group identifier attribute. The first group identifier attribute may be different than the second group identifier attribute, in some examples. Each communication client connected to communication session 26 may send to communication server 22 the attribute associated with the user. Communication server 22 may further associate the attribute of each user with the user's video feed. When communication server 22 sends one or more video feeds to communication client 6 connected to communication session 26, communication client 6 may determine, based on the attribute associated with the video feed, which group the video feed is associated with. Communication client 6 may then apply parameters having a group name that matches a group attribute associated with a video feed.

In other examples, communication client 6 may identify the group attribute associated with each video feed. Based on the identity of each group attribute, communication client 6 may further determine the number of unique group attributes of video feeds received from communication server 22. For instance, communication client 6 may determine that each of the video feeds received from communication server 22 is associated with a group attribute of customer or vendor. Consequently, communication client 6 may determine that there are two distinct groups. Because communication client 6 may determine there are two distinct groups, communication client 6 may apply parameters of group1 to video feeds having a group attribute of customer. Communication client 6 may further apply parameters of group2 to video feeds having a group attribute of vendor. Thus, communication client 6 may flexibly and generically apply parameters of a theme to video feeds associated with different group attributes without requiring exact matching of group names of parameters to group attributes associated with video streams.

Line 17 further specifies a trigger with type active_speaker. In some examples, communication module 8 may determine that the position and size specified in <trigger: active_speaker> is applied to a graphical element of type video-feed when an event of type active_speaker is associated with a video feed. Server module 25 may associate an event of type active_speaker with a video feed received from a computing device that is sending audio data based on an audio signal provided by a user to communication session 26. For instance, server module 25 may associate an active_speaker event with a video stream of a user that is presently speaking, e.g., providing an audio signal to generate audio data, in communication session 26. Server module 25 may send the event to communication module 8, which may determine, based the trigger of Line 18 of the parameter, to position the video feed, e.g., video feed 84, of the active speaker in the center of GUI 12 (Line 19) and display the video feed as a size of type large (Line 20). Thus, as shown in FIG. 3, row 76A may be positioned at an opposite side of GUI 12 from the side row 76B is positioned. Video feed 84, as shown in FIG. 3, may be positioned between row 76A and 76B. In other examples, parameters may indicate that each of the video feeds is of the same size and the video feeds are displayed by output device 10 in substantially parallel rows. For instance, communication client 6 may cause four video feeds to be displayed in GUI 12 as a 2×2 matrix of video feeds, wherein each video feed is of the same size and each of the row of two video feeds is substantially parallel (e.g., horizontally) to the other.

Other examples of triggers may include a trigger that specifies a computing device that initiated the communication session. For instance, the trigger may cause communication client 6 to display the video feed of the computing device that initiated the communication session as a video feed having a size that is larger than other video feeds included in the GUI.

In some examples, one or more parameters specify that a computing device superimpose graphical content for display on a selected video feed of the plurality of video feeds at the GUI. In some examples, the parameters may indicate the graphical content is superimposed on a graphical element when server device 20 receives an event. For instance, graphical content may include an image 90 that is superimposed on a video feed in GUI 12. In one example, image 90 is superimposed on the video feed when the audio data associated with the video feed has been muted. For instance, the user of the computing device that generates the video feed may provide a user input that mutes the audio data associated with the video feed. Upon muting the audio data, the computing device may send an event to communication server 22. Communication server 22 may send the event to client device 4. Client module 8 may receive the event and based on a parameter of a theme associated with the event, client module 8 may cause output device 10 to display image 90 as superimposed on the video feed. In one example, a theme may "black out" video feeds of users when an event occurs, e.g., a first user mutes his or her web camera or a second user provides a user input to block the video feed of the first user from being displayed at the second user's computing device.

In some examples, a parameter of a theme indicates that a computing device may modify at least one audio stream of a plurality of audio streams generated by the computing devices. For instance, communication server 22 may send a plurality of audio streams to computing devices connected to communication session 26 for output at a plurality of output devices of the computing devices. The audio streams may include, for example, audio data generated from audio signals provided by each user. In one example, a parameter of a theme stored on server device 20 may specify that a volume level of an audio stream associated with the current speaker is increased. In another example, a parameter may specify that a volume level of each audio stream associated with a computing device of a user that is not speaking is muted.

In one example, user 38A may currently be speaking. Consequently, client device 34A receives the audio signal of user 38A's voice and converts the signal to audio data. Communication client 36A sends the audio data as an audio stream to communication server 22. Upon receiving the stream, theme module 24 may associate an active_speaker event with the audio stream. The active_speaker event indicates the audio stream is associated with an audio stream of an active speaker. Server module 25 may send the audio stream and active_speaker event to each of client devices 4 and 38B. Communication client 6, for example, may receive the audio stream and active_speaker event. Communication client 6 may further determine that a parameter of a theme presently applied by communication client 6 causes communication client 6 to increase the volume of the audio stream associated with the active_speaker event.

Example Operations

Figure 4:
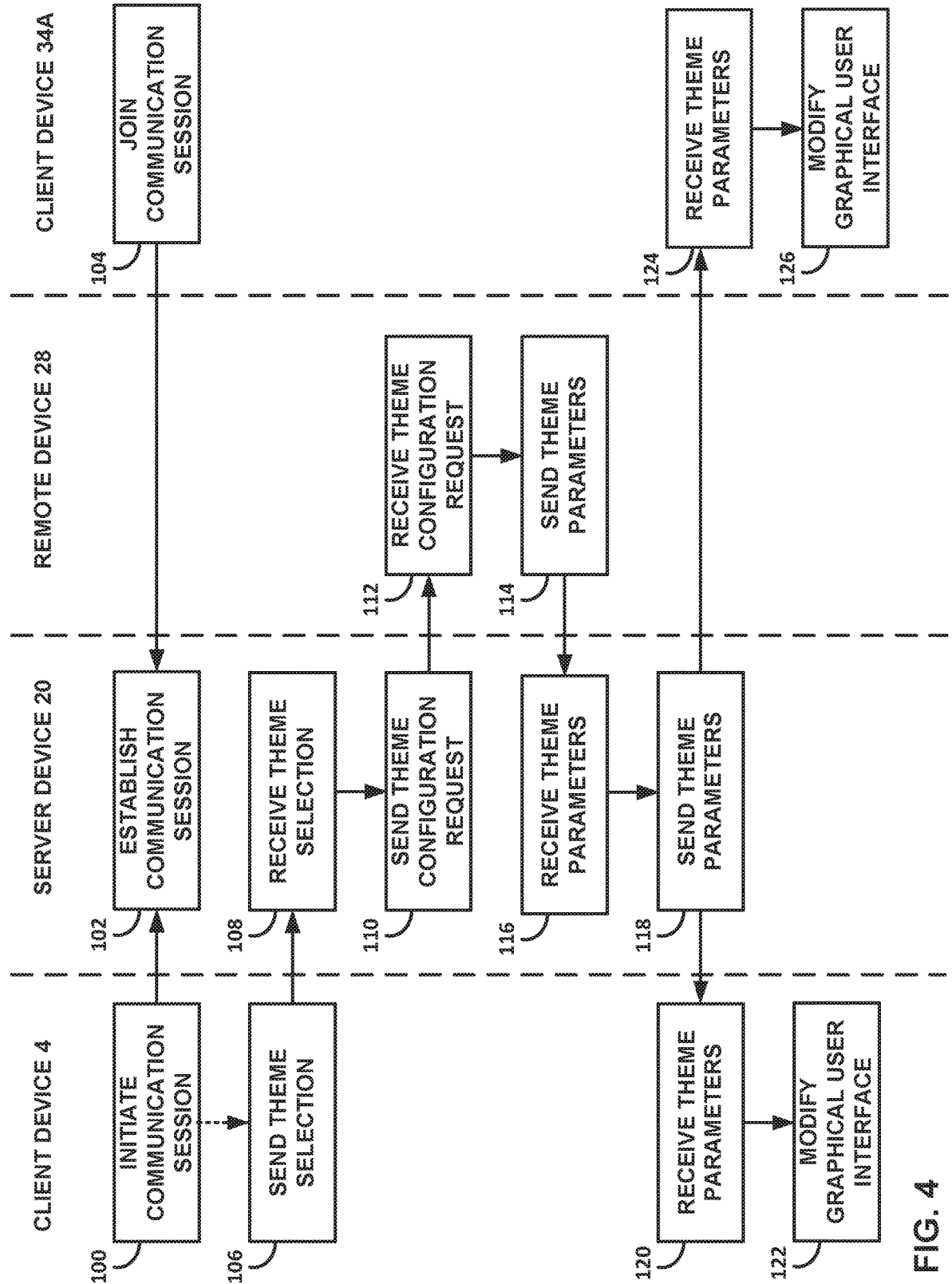
FIG. 4 is a flowchart illustrating an example operation that includes a server device that sends parameters to computing devices connected to a communication session to modify visual properties of GUIs displayed at each of the computing devices, in accordance with one or more aspects of the present disclosure.

FIG. 4 is a flowchart illustrating an example operation that includes a server device that sends parameters to the computing devices connected to a communication session to concurrently modify visual properties of GUIs displayed at each of the computing devices, in accordance with one or more aspects of the present disclosure. The example operations as described in FIG. 4 may be performed by client device 4, server device 20, remote device 28, and client device 34B of FIG. 1. As shown in FIG. 4, client device 4 may send a request to initiate a communication on server device 20 (100). Upon receiving the request, server device 20 may establish a communication session and generate session data associated with the communication session (102). For instance, session data may indicate that client device 4 is connected to the communication session and further that client device 34A is permitted to join the communication session. At a later time, client device 34A may join the communication session (104), e.g., after receiving an invitation from client device 4 or discovering the communication session in a feed.

The user of client device 4 may wish to change the look and feel of GUIs of each communication client executing on client devices connected to the communication session. Consequently, user may provide a user input that selects a theme and causes client device 4 to send a message that indicates the selected theme to server device 20 (106). Server device 20 may subsequently receive the theme selection (108). Upon receiving the theme selection, server device 20 may send a message, for example, a configuration request that indicates the selected theme to remote device 28 (112). Remote device 28 as shown in FIG. 1, may store one or more themes. Upon receiving the configuration request from server device 20, remote device 28 may select the parameters of the theme and send the parameters to server device 20 (114).

Server device 20 may subsequent receive the theme parameters (116). Upon receiving the theme parameters, server device 20 may determine which client devices are connected to the communication session. Server device 20, upon determining which client devices are connected to the communication session, may send the theme parameters to each of the connected client devices (118). In the current example, client device 4 receives the theme parameters from server device 20 (120). Client device 4 may then apply the theme parameters thereby modifying visual properties of one or more graphical elements included in the GUI generated by client device 4 (122). Client device 34A also receives theme parameters from server device 20 (124). Client device 34A may then similarly apply the theme parameters thereby modifying visual properties of one or more graphical elements included in the GUI generated by client device 34A (126).

Example Operations

Figure 5:
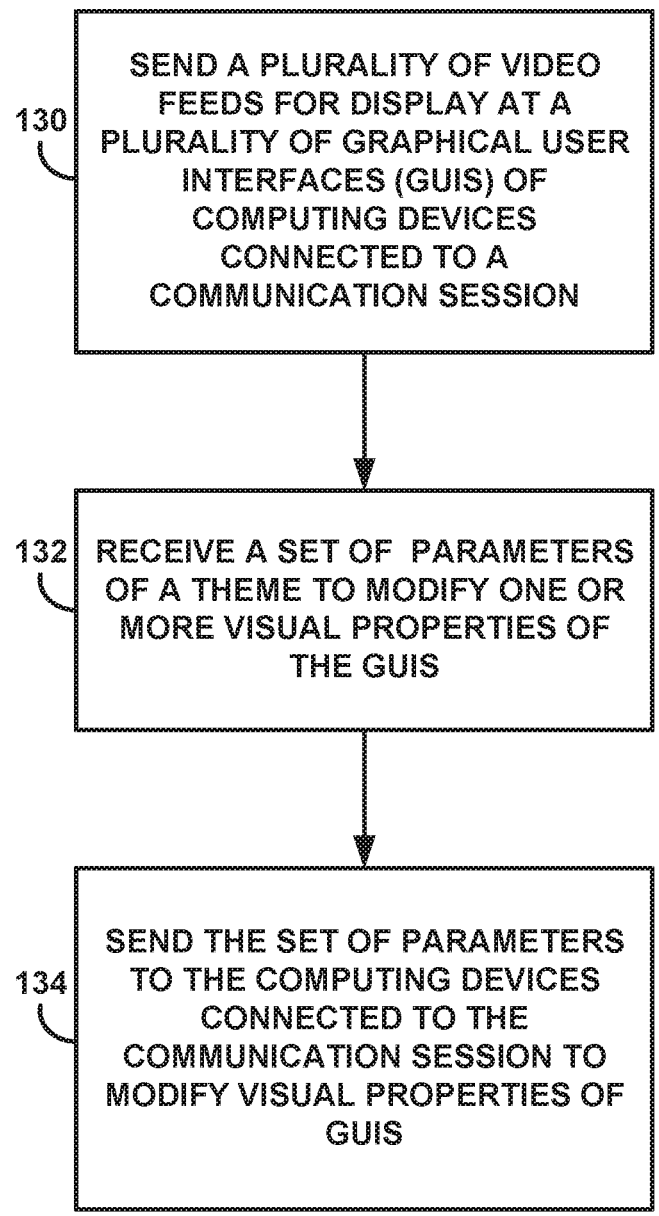
FIG. 5 is a flow diagram illustrating an example operation that may be performed by a computing device to send a set of parameters to computing devices connected to a communication session to modify visual properties of GUIs displayed at each of the plurality of computing devices, in accordance with one or more aspects of the present disclosure.

FIG. 5 is a flow diagram illustrating an example operation that may be performed by a computing device to send a set of parameters to computing devices connected to a communication session to concurrently modify visual properties of GUIs displayed at each of the plurality of computing devices, in accordance with one or more aspects of the present disclosure. The example operation illustrated in FIG. 5 may be performed by server device 20 shown in FIGS. 1 and/or 2. The operation of FIG. 5 includes sending, by a computing device, a plurality of video feeds for display at a plurality of graphical user interfaces (GUIs) of computing devices connected to a communication session, wherein the communication session enables communication among a plurality of users, and wherein each of the plurality of video feeds includes a visual representation of a user participating in the communication session (130). The operation of FIG. 5 also includes receiving, by the computing device, a set of parameters of a theme to modify one or more visual properties of the GUIs (132). The operation further includes sending, by the computing device, the set of parameters to the computing devices connected to the communication session to concurrently modify visual properties of GUIs displaying the plurality of video feeds at each of the plurality of computing devices (134).

In one example, the method includes sending, by the computing device, a request that identifies the theme to a remote server that stores a plurality of themes; and receiving, by the computing device, the set of parameters of the theme. In one example, the one or more visual properties of the communication session include graphical positions of each of the plurality of visual feeds in the graphical user interface. In another example, the one or more visual properties of the communication session include graphical orientations of each of the plurality of visual feeds in the graphical user interface. In one example, the one or more visual properties of the communication session include sizes of each of the plurality of visual feeds in the graphical user interface.

In one example, the graphical user interface includes one or more graphical elements, and wherein the one or more visual properties of the communication session include one or more colors of the one or more graphical elements. In another example, one or more graphical elements include at least one of a background image, text, control buttons, input field, or scrollbar. In one example, the set of parameters specify data that indicates to the plurality of computing devices to display each of the plurality of video feeds as a first size at the GUI, and the data indicates of parameters to the plurality of computing devices to display the plurality of video feeds in a substantially parallel orientation at the GUI.

In one example, the set of parameters specify data that indicates to the plurality of computing devices to display the plurality of video feeds in a substantially parallel orientation at the GUI; the data indicates to the plurality of computing devices to select a video feed of the plurality of video feeds, wherein the selected video feed is associated with a second computing device that generates audio data based on an audio signal provided by a user; and the data indicates to the plurality of computing devices to display at the GUI the selected video feed as a first size and the plurality of video feeds as a second size, wherein the first size is larger than the second size. In one example, the data further indicates to the plurality of computing devices to display the plurality of video feeds adjacent to a side of the GUI.

In one example, the set of parameters specify data that indicates to the plurality of computing devices to display a first group of the plurality of video feeds in a first substantially parallel orientation at a first location the GUI and a second group of the plurality of video feeds in a second substantially parallel orientation at a second location of the GUI; the data indicates to the plurality of computing devices to select a video feed of the plurality of video feeds, wherein the selected video feed is associated with a second computing device that is sending audio data based on an audio signal provided by a user to the communication session; the data indicates to the plurality of computing devices to display at the GUI the selected video feed as a first size and the plurality of video feeds as a second size, wherein the first size is larger than the second size; the data indicates to the plurality of computing devices to display at the GUI the first group of the plurality of video feeds adjacent to a first side of the GUI and the second group of the plurality of video feeds adjacent to a second side of the GUI, wherein the first side and the second side include opposite sides of the GUI, and the data indicates to the plurality of computing devices to display at the GUI the selected video feed between the first group of the plurality of video feeds and the second group of the plurality of video feeds.

In one example, the first group of the plurality of video feeds are associated with a first attribute; the second group of the plurality of video feeds are associated with a second attribute; and the first attribute is not equal to the second attribute. In one example, the first attribute indicates a first group of users, wherein each user of the first group of users is related to users of the first group of users and the second attribute indicates a second group of users, wherein each user of the second group of users is related to users of the second group of users.

In one example, the set of parameters specify data that indicates to the plurality of computing devices to display the plurality of video feeds in a substantially parallel orientation at the GUI; the data indicates to the plurality of computing devices to select a video feed of the plurality of video feeds, wherein the selected video feed is associated with a second computing device that initiated the communication session; and the data indicates to the plurality of computing devices to display at the GUI the selected video feed as a first size and the plurality of video feeds as a second size, wherein the first size is larger than the second size. In one example, the set of parameters specify data that indicates to the plurality of computing devices to superimpose a graphical content for display on a selected video feed of the plurality of video feeds at the GUI when an event is received by the computing device.

In one example, the event includes muting a microphone of one of the plurality of computing devices, and wherein the graphical element includes an image. In one example, the method includes detecting, by the computing device, an event associated with a trigger of the theme, wherein the trigger specifies data that modifies visual properties of the GUIs displayed the plurality of computing devices; and responsive to detecting the event, storing, by the computing device, the data in the set of parameters. In one example, the event indicates that a new computing device has connected to the communication session to enable communication between a new user of the new computing device and the plurality of users of the computing devices. In one example, a parameter of the set of parameters of the theme indicates to the plurality of computing devices to modify at least one audio stream of a plurality of audio streams generated by the computing devices, wherein the computing device sends the plurality of audio streams to computing devices connected to the communication session for output at a plurality of output devices of the computing devices.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. A computer-implemented method, comprising:
joining, by a client computing device, a videoconference session hosted by a server computing device, wherein a plurality of computing devices including the client computing device participate in the videoconference session;
upon joining the videoconference session, displaying, by the client computing device, a graphical user interface (GUI) for the videoconference session on a display of the client computing device, the GUI defining a layout of video windows for respective video feeds from the plurality of computing devices associated with a plurality of users;
in response to a trigger condition, receiving, by the client computing device and from the server computing device, a command for modifying one or more parameters that identify graphical elements of the respective video feeds and specify a modifier of one or more visual properties to be applied to the respective graphical elements of the videoconference session at the client computing device to provide a look of the GUI of the client computing device that is similar to respective GUIs of each other device of the plurality of computing devices, the command being based on a theme that specifies a first group of the plurality of users and a second group of the plurality of users distinct from the first group, wherein the first group and the second group are determined based on at least one attribute associated with video feeds of respective users of the plurality of users, and wherein the trigger condition includes at least one of: (a) a particular time, day, or season of the videoconference session, or (b) joining to the videoconference session, at least one additional computing device not already participating in the videoconference session; and
in response to receiving the command, applying the modifier to the respective graphical elements, by the client computing device, to display in a first area of the GUI, the video feeds of the respective users of the first group and to display in a second area of the GUI distinct from the first area, the video feeds of the respective users of the second group.

2. The computer-implemented method of claim 1, further comprising:
transmitting, from the client computing device and to the server computing device, a request for a list of themes stored at the server computing device;
receiving, by the client computing device and from the server computing device, the list of themes; and
outputting, by the client computing device, the list of themes.

3. The computer-implemented method of claim 2, further comprising:
receiving, by the client computing device, a selection of the theme from the list of themes; and
transmitting, by the client computing device and to the server computing device, the selection, wherein receipt of the selection causes the server computing device to transmit the command to the client computing device.

4. The computer-implemented method of claim 1, wherein the theme further specifies an image, and further comprising in response to receiving the command, superimposing, by the client computing device, the image over at least one of the video feeds.

5. The computer-implemented method of claim 1, wherein the theme further specifies at least one of a color and a background image, and further comprising in response to receiving the command, at least one of (i) modifying, by the client computing device, a graphical element of the GUI to have the color and (ii) modifying, by the client computing device, the GUI to include the background image.

6. The computer-implemented method of claim 1, wherein each video feed has a corresponding audio feed, and further comprising in response to receiving the command, modifying, by the client computing device, a volume level of at least one of the audio feeds.

7. The computer-implemented method of claim 1, wherein the command for modifying the one or more parameters, specifies at least one of a different size, position, or appearance of the video feeds of the respective users of the first group than the video feeds of the respective users of the second group.

8. A client computing device, comprising:
a non-transitory computer-readable medium having a set of instructions stored thereon; and
one or more processors configured to execute the set of instructions, which causes the client computing device to perform operations comprising:
joining, by a client computing device, a videoconference session hosted by a server computing device, wherein a plurality of computing devices including the client computing device participate in the videoconference session upon joining the videoconference session, displaying a graphical user interface (GUI) for the videoconference session on a display of the client computing device, the GUI defining a layout of video windows for respective video feeds from the plurality of computing devices associated with a plurality of users;
in response to a trigger condition, receiving, by the client computing device and from the server computing device, a command for modifying one or more parameters that identify graphical elements of the respective video feeds of the GUI of the client computing device and specify a modifier of one or more visual properties to be applied to the respective graphical elements of the videoconference session at the client computing device to provide a look of the GUI of the client computing device that is similar to respective GUI's of each of the plurality of computing devices, the command being based on a theme that specifies a first group of the plurality of users and a second group of the plurality of users distinct from the first group, wherein the first group and the second group are determined based on at least one attribute associated with video feeds of respective users of the plurality of users, and wherein the trigger condition includes at least one of: a particular time, day, or season of the videoconference session; and
in response to receiving the command, applying the modifier to the respective graphical elements, by the client computing device, to display in a first area of the GUI, the video feeds of the respective users of the first group and to display in a second area of the GUI distinct from the first area, the video feeds of the respective users of the second group.

9. The client computing device of claim 8, wherein the operations further comprise:
transmitting, to the server computing device, a request for a list of themes stored at the server computing device;
receiving, from the server computing device, the list of themes; and
outputting, by the client computing device, the list of themes.

10. The client computing device of claim 9, wherein the operations further comprise:
receiving a selection of the theme from the list of themes; and
transmitting, to the server computing device, the selection, wherein receipt of the selection causes the server computing device to transmit the command to the client computing device.

11. The client computing device of claim 8, wherein the theme further specifies an image, and wherein the operations further comprise:
in response to receiving the command, superimposing the image over at least one of the video feeds.

12. The client computing device of claim 8, wherein the theme further specifies at least one of a color and a background image, and wherein the operations further comprise:
in response to receiving the command, at least one of (i) modifying a graphical element of the GUI to have the color and (ii) modifying the GUI to include the background image.

13. The client computing device of claim 8, wherein each video feed has a corresponding audio feed, and wherein the operations further comprise:
in response to receiving the command, modifying a volume level of at least one of the audio feeds.

14. The client computing device of claim 8, wherein the command for modifying the one or more parameters, specifies at least one of a different size, position, or appearance of the video feeds of the respective users of the first group than the video feeds of the respective users of the second group.

15. A non-transitory, computer-readable medium having a set of instructions stored thereon that, when executed by one or more processors of a client computing device, causes the client computing device to perform operations comprising:
joining a videoconference session hosted by a server computing device, the videoconference session including a plurality of other computing devices;
upon joining the videoconference session, displaying a graphical user interface (GUI) for the videoconference session on a display of the client computing device, the GUI defining a layout of video windows for respective video feeds from the plurality of computing devices associated with a plurality of users;
in response to a trigger condition, receiving, by the client computing device and from the server computing device, a command for modifying one or more parameters that identify graphical elements of the respective video feeds of the GUI of the client computing device and specify a modifier of one or more visual properties to be applied to the respective graphical elements of the videoconference session at the client computing device to provide a look of the GUI of the client computing device that is similar to respective GUI's of each of the plurality of computing devices, the command being based on a theme that specifies a first group of the plurality of users and a second group of the plurality of users distinct from the first group, wherein the first group and the second group are determined based on at least one attribute associated with video feeds of respective users of the plurality of users, and wherein the trigger condition includes at least one of: a particular time, day or season of the videoconference session, or joining to the videoconference session, at least one additional computing device not already participating in the videoconference session; and
in response to receiving the command, applying the modifier to the respective graphical elements, by the client computing device, to display in a first area of the GUI, the video feeds of the respective users of the first group and to display in a second area of the GUI distinct from the first area, the video feeds of the respective users of the second group.

16. The computer-readable medium of claim 15, wherein the operations further comprise:
transmitting, to the server computing device, a request for a list of themes stored at the server computing device;
receiving, from the server computing device, the list of themes;
outputting, by the client computing device, the list of themes;

receiving a selection of the theme from the list of themes; and transmitting, to the server computing device, the selection, wherein receipt of the selection causes the server computing device to transmit the command to the client computing device.

17. The computer-readable medium of claim 15, wherein the theme further specifies an image, and wherein the operations further comprise:

in response to receiving the command, superimposing the image over at least one of the video feeds.

18. The computer-readable medium of claim 15, wherein the theme further specifies at least one of a color and a background image, and wherein the operations further comprise:

in response to receiving the command, at least one of (i) modifying a graphical element of the GUI to have the color and (ii) modifying the GUI to include the background image.

19. The computer-readable medium of claim 15, wherein each video feed has a corresponding audio feed, and wherein the operations further comprise:

in response to receiving the command, modifying a volume level of at least one of the audio feeds.

20. The computer-readable medium of claim 15, wherein the command for modifying the one or more parameters, specifies at east one of a different size, position, or appearance of the video feeds of the respective users of the first group than the video feeds of the respective users of the second group.

* * * * *